US011199384B2

(12) United States Patent
Koh et al.

(10) Patent No.: US 11,199,384 B2
(45) Date of Patent: Dec. 14, 2021

(54) LIGHTWEIGHT CARTRIDGE CASE

(71) Applicant: ADVANCED MATERIAL ENGINEERING PTE LTD, Singapore (SG)

(72) Inventors: Chun Kang Koh, Singapore (SG); Juan Kiat Quek, Singapore (SG); Su Shan Ng, Singapore (SG); Wen Jun Edwin Ang, Singapore (SG); Cheng Hok Aw, Singapore (SG)

(*) Notice: Subject to any disclaimer, the term of this patent is extended or adjusted under 35 U.S.C. 154(b) by 0 days.

(21) Appl. No.: 16/967,144

(22) PCT Filed: Feb. 1, 2019

(86) PCT No.: PCT/SG2019/050061
§ 371 (c)(1),
(2) Date: Aug. 4, 2020

(87) PCT Pub. No.: WO2019/151954
PCT Pub. Date: Aug. 8, 2019

(65) Prior Publication Data
US 2020/0363172 A1    Nov. 19, 2020

(30) Foreign Application Priority Data
Feb. 4, 2018  (SG) .............. 10201800959S

(51) Int. Cl.
*F42B 5/30*    (2006.01)
*F42B 5/26*    (2006.01)
(Continued)

(52) U.S. Cl.
CPC .............. *F42B 5/26* (2013.01); *F42B 5/025* (2013.01); *F42B 5/16* (2013.01); *F42B 5/30* (2013.01); *B29L 2031/7772* (2013.01)

(58) Field of Classification Search
CPC .......... F42B 33/001; F42B 5/02; F42B 33/00; F42B 33/0207; F42B 33/02; F42B 33/04; F42B 5/30; F42B 5/307
(Continued)

(56) References Cited

U.S. PATENT DOCUMENTS 3,269,311 A * 8/1966 Comerford ............... F42B 7/08
                                                    102/451
7,213,519 B2 * 5/2007 Wiley ..................... B29C 65/02
                                                    102/464
(Continued)

FOREIGN PATENT DOCUMENTS

GB            885369 A      12/1961

OTHER PUBLICATIONS

ISR; Intellectual Property Office of Singapore; dated May 14, 2019.

*Primary Examiner* — Jonathan C Weber
(74) *Attorney, Agent, or Firm* — Patshegen IP LLC; Moshe Pinchas

(57) ABSTRACT

The present invention discloses a lightweight hybrid cartridge case (100) for a cartridged ammunition and a method of manufacture (200). The lightweight hybrid cartridge case (100) includes a cap (110) with a cylindrical sidewall (112) connected a base (120); a polymer shell (150) is insert-molded onto the sidewall of the cap; and an overmolded sleeve (180) is formed to cover the metal-polymer joint between the cap (110) and the polymer sleeve (150). The cylindrical sidewall (112) covered by the overmolded sleeve (180) has a plurality of stepped ridges (132, 132a), preferably with one stepped ridge (133) having a C-stepped edge (134).

14 Claims, 3 Drawing Sheets

(51) Int. Cl.
    *F42B 5/02*    (2006.01)
    *F42B 5/16*    (2006.01)
    *B29L 31/00*   (2006.01)
(58) Field of Classification Search
    USPC .................. 102/466, 467, 516, 517, 465
    See application file for complete search history.

(56) References Cited

U.S. PATENT DOCUMENTS

| | | | | |
|---|---|---|---|---|
| 8,443,730 B2* | 5/2013 | Padgett | .................... | F42C 19/10 |
| | | | | 102/466 |
| 8,573,126 B2* | 11/2013 | Klein | ........................ | F42B 5/36 |
| | | | | 102/467 |
| 8,763,535 B2* | 7/2014 | Padgett | .................... | F42B 12/76 |
| | | | | 102/467 |
| 8,869,702 B2* | 10/2014 | Padgett | .................... | F42B 5/307 |
| | | | | 102/466 |
| 8,875,633 B2* | 11/2014 | Padgett | .................... | B29C 65/72 |
| | | | | 102/466 |
| 9,003,973 B1* | 4/2015 | Padgett | .................... | F42B 5/307 |
| | | | | 102/467 |
| 9,032,855 B1* | 5/2015 | Foren | ........................ | F42B 5/30 |
| | | | | 86/19.5 |
| 9,631,907 B2* | 4/2017 | Burrow | ................. | F42B 33/001 |
| 9,835,423 B2* | 12/2017 | Burrow | .................... | C22C 38/02 |
| 9,976,840 B1* | 5/2018 | Burrow | ................... | F42B 5/313 |
| 10,145,662 B2* | 12/2018 | Burrow | ................... | C04B 35/64 |
| 10,234,253 B2* | 3/2019 | Burrow | ................... | C04B 35/64 |
| 10,254,096 B2* | 4/2019 | Burrow | .................... | B22F 3/004 |
| 10,352,670 B2* | 7/2019 | Burrow | .................... | F42B 5/02 |
| 10,900,760 B2* | 1/2021 | Burrow | .................... | C22C 38/18 |
| 10,907,944 B2* | 2/2021 | Burrow | .................... | F42B 5/30 |
| 11,047,661 B2* | 6/2021 | Burrow | ............... | F42C 19/0807 |
| 11,047,662 B2* | 6/2021 | Burrow | .................... | F42B 5/02 |
| 11,047,664 B2* | 6/2021 | Burrow | ............... | C22C 33/0257 |
| 11,079,209 B2* | 8/2021 | Burrow | .................... | F42B 5/30 |
| 2005/0005807 A1* | 1/2005 | Wiley | ................... | F42B 12/745 |
| | | | | 102/517 |
| 2006/0075919 A1* | 4/2006 | Wiley | ....................... | F42B 5/26 |
| | | | | 102/464 |
| 2012/0024183 A1* | 2/2012 | Klein | ........................ | F42B 5/36 |
| | | | | 102/467 |
| 2012/0180687 A1* | 7/2012 | Padgett | .................... | F42B 5/313 |
| | | | | 102/466 |
| 2012/0180688 A1* | 7/2012 | Padgett | .................... | B29C 65/72 |
| | | | | 102/466 |
| 2013/0014664 A1* | 1/2013 | Padgett | .................... | F42B 5/313 |
| | | | | 102/439 |
| 2013/0186294 A1* | 7/2013 | Davies | .................... | F42B 5/313 |
| | | | | 102/467 |
| 2014/0060372 A1* | 3/2014 | Padgett | .................... | F42B 5/30 |
| | | | | 102/466 |
| 2014/0216293 A1* | 8/2014 | Klein | ...................... | F42B 5/307 |
| | | | | 102/467 |
| 2014/0290522 A1* | 10/2014 | Padgett | .................... | F42B 3/24 |
| | | | | 102/466 |
| 2014/0373744 A1* | 12/2014 | Padgett | ................. | F42C 19/083 |
| | | | | 102/466 |
| 2015/0047527 A1* | 2/2015 | Padgett | .................... | F42C 19/10 |
| | | | | 102/466 |
| 2015/0122142 A1* | 5/2015 | Padgett | .................... | F42B 33/02 |
| | | | | 102/439 |
| 2015/0241183 A1* | 8/2015 | Padgett | .................... | F42B 5/313 |
| | | | | 102/466 |
| 2015/0260490 A1* | 9/2015 | Burrow | ................. | F42B 33/001 |
| | | | | 102/467 |
| 2016/0003590 A1* | 1/2016 | Burrow | .................. | F42B 5/025 |
| | | | | 102/467 |
| 2016/0003593 A1* | 1/2016 | Burrow | .................. | F42B 33/00 |
| | | | | 102/200 |
| 2016/0003601 A1* | 1/2016 | Burrow | ............... | C22C 33/0257 |
| | | | | 102/467 |
| 2016/0033241 A1* | 2/2016 | Burrow | .................... | F42B 5/02 |
| | | | | 102/466 |
| 2016/0146585 A1* | 5/2016 | Padgett | .................... | F42B 12/76 |
| | | | | 102/466 |
| 2016/0169641 A1* | 6/2016 | Padgett | ................. | B29C 69/001 |
| | | | | 102/466 |
| 2017/0261299 A1* | 9/2017 | Burrow | .................... | F42B 5/313 |
| 2018/0292186 A1* | 10/2018 | Padgett | ................. | F42C 19/083 |

* cited by examiner

LIGHTWEIGHT CARTRIDGE CASE

FIELD OF INVENTION

The present invention relates to lightweight cartridge cases for small arms ammunition. In particular, the invention relates to a hybrid cartridge case made up of a two-part injection molded polymer shell and an aluminium base cap.

BACKGROUND

Advances in technology have resulted in soldiers carrying additional gears to enhance combat effectiveness. The heaviest load for soldiers is the ammunition. Conventional ammunition cartridges made from brass are heavy and expensive. Lightweight replacements of brass cartridge cases have been explored; fully plastic casings have failed to withstand high temperatures and shocks associated with repeated, rapid firings. Thus far, many plastic materials and casing designs have been proposed but none has been adopted for mass production.

In one approach, U.S. Pat. No. 8,186,273 by Blaine Trivette, discloses an injection molded polymeric cartridge case. The polymer cartridge case includes a tubular body having an open end for receiving a projectile and a substantially closed end. A periphery at the closed end is grooved to define an extraction rim; an aperture in the closed end is provided to receive a primer cap. The polymer cartridge case is made from polyphenylene sulfide containing fiberglass or polycarbonate, nylon, polyethylene, polypropylene and PET.

In another approach, U.S. Pat. No. 8,156,870 assigned to the US Army, discloses a lightweight cartridge case including a steel sleeve and a steel base connected to the steel sleeve. The steel base has a central aperture in which is fitted an annular ring made of a fibre reinforced polymer. A weight reduction is attributed to the lower density of the fibre reinforced polymer ring.

Other approaches are those disclosed in U.S. Pat. No. 9,683,818 (assigned to Polycase Ammunition, LLC); U.S. Pat. No. 9,335,137 (assigned to MAC, LLC); U.S. Pat. No. 9,091,516 (assigned to Nylon Corp. of America, Inc.) and U.S. Pat. No. 8,561,543 (assigned to True Velocity, Inc.).

It can thus be seen that there exists a need for another type of lightweight cartridge case and a method of manufacture. Such lightweight cartridge cases must mean that cartridged ammunition thus made must meet the safety, reliability and ballistic performance of existing ammunition in existing weapons.

SUMMARY

The following presents a simplified summary to provide a basic understanding of the present invention. This summary is not an extensive overview of the present invention, and is not intended to identify key features of the invention. Rather, it is to present some of the inventive concepts of this invention in a generalised form as a prelude to the detailed description that is to follow.

The present invention seeks to provide lightweight hybrid cartridge cases for small arm ammunition that replace conventional brass cartridged ammunition. Desirably, the hybrid cartridge cases must be strong, stable and reliable to withstand both mechanical shock and thermal shock during firing. A new desired criterion is that no part must shatter or no airborne debris is released during firing.

In one embodiment, the present invention provides a lightweight hybrid cartridge case comprising: a base cap made of aluminium and having a cylindrical sidewall connected to a base, wherein the base is dimensioned according to a cartridged ammunition and wherein a periphery surface of the base is formed with an annular grooved extraction rim and a plurality of stepped ridges located forward of the extraction rim; a polymer sleeve made from a mixture of glass and carbon fibres reinforced polyamide, with the polymer sleeve having a forward bottleneck opening and a rear stepped diametral end, wherein the stepped diametral end is insert molded onto the cylindrical sidewall of the base cap at a location contiguous with a first (forward) of the plurality of the stepped ridges; and an overmolded sleeve made of the same material as the polymer sleeve is overmolded over the plurality of stepped ridges and the stepped diametral end, so that an outside diameter of the overmolded sleeve matches the outside diameters of both the extraction rim and the polymer sleeve.

Preferably, the plurality of stepped ridges comprises three stepped ridges. Preferably, a diameter of the first (forward) of the plurality of stepped ridges is smaller than the diameter of the remaining stepped ridges. In one embodiment, the third (rear) stepped ridge has a C-shaped edge in which the C-shape is forward facing; the second and the third stepped ridges may be spirally connected.

Preferably, the reinforced polyamide has properties exceeding a yield strength of substantially 160 MPa, exceeding an impact strength of substantially 180 J/m and has low moisture absorption.

In another embodiment, the present invention provides a method of manufacture of a hybrid cartridge case; the method comprises: forming a base cap from an aluminium, with the base cap having a cylindrical sidewall connected to a base, with the base being dimensioned according to a cartridge ammunition; forming an annular groove extraction rim at a periphery surface of the base and a plurality of stepped ridges forward of the extraction rim; forming a primer cavity at a rear end of the base cap; forming a flash hole to connect the primer cavity with an interior cavity of the base cap; injection molding a polymer sleeve made from a mixture of glass and carbon fibres reinforced polyamide, with the polymer sleeve having a forward bottleneck opening and a rear stepped diametral end, and inserting each base cap into a molded polymer sleeve so that the base cap is contiguous with a first of the plurality of stepped ridges; and overmolding a sleeve with the same material as the polymer sleeve over the plurality of stepped ridges and stepped diametral end of the polymer sleeve, so that an outside diameter of the overmolded sleeve matches the outside diameters of both the extraction rim and the polymer sleeve to form a hybrid cartridge case.

The method of manufacture further comprises: filling an interior cavity of the hybrid cartridge case with a predetermined amount of propellant; press-fitting a projectile into the bottleneck opening; and fitting a primer cap into the primer cavity. Preferably, a varnish is applied on an inside surface of a mouth at the forward bottleneck opening prior to press-fitting.

An ammunition article is also provided by using the lightweight hybrid cartridge case or method of manufacture of the lightweight hybrid cartridge case according to the present invention.

BRIEF DESCRIPTION OF THE DRAWINGS

This invention will be described by way of non-limiting embodiments of the present invention, with reference to the accompanying drawings, in which.

DETAILED DESCRIPTION

Figure 1B:
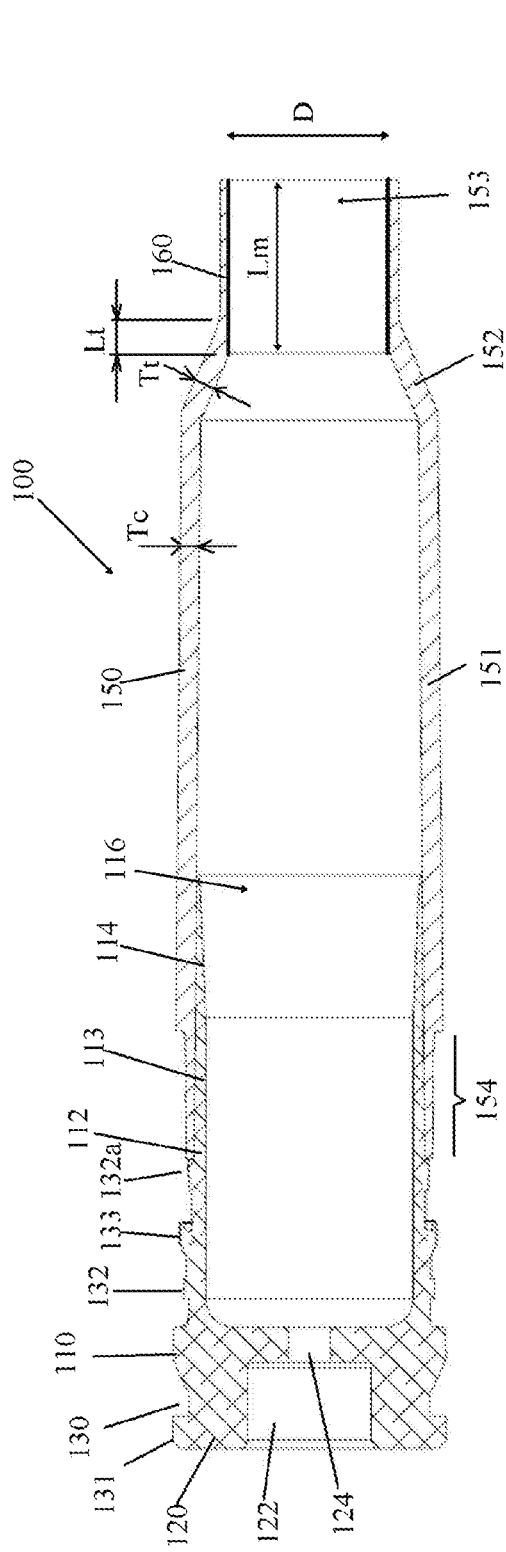
FIG. 1B illustrates the lightweight hybrid cartridge case according to an embodiment of the present invention.

One or more specific and alternative embodiments of the present invention will now be described with reference to the attached drawings. It shall be apparent to one skilled in the art, however, that this invention may be practised without such specific details. Some of the details may not be described at length so as not to obscure the present invention. For ease of reference, common reference numerals or series of numerals will be used throughout the figures when referring to the same or similar features common to the figures.

Figure 1A:
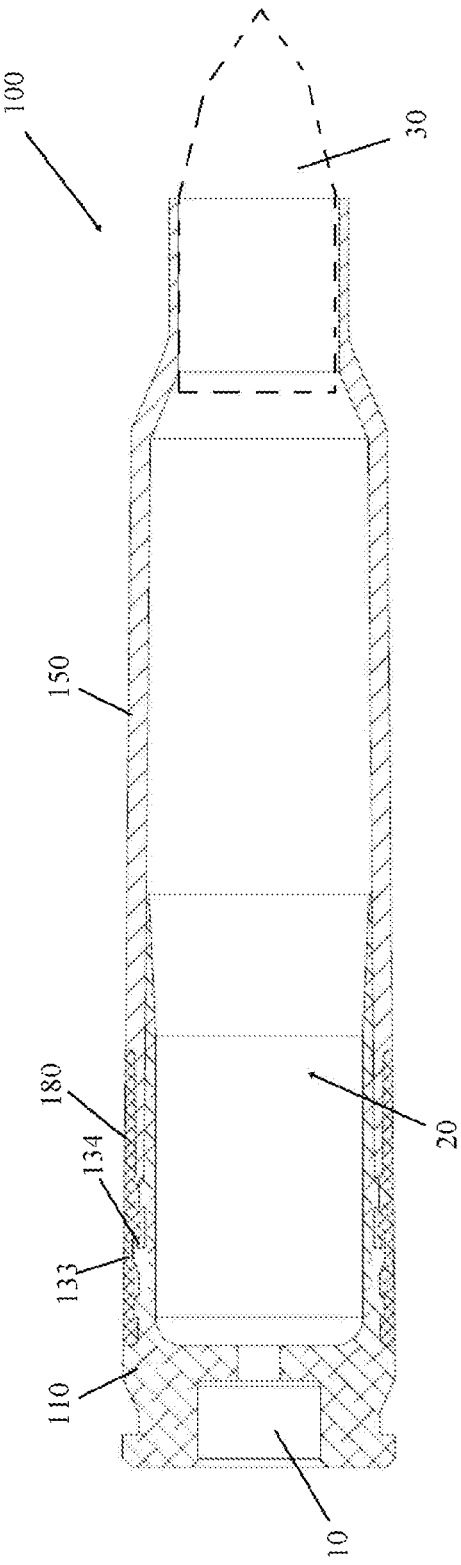
FIG. 1A illustrates a sectional view of a partially formed lightweight hybrid cartridge case.

FIG. 1A shows a sectional view of a lightweight hybrid cartridge case 100 according to one embodiment of the present invention, whilst FIG. 1B shows a partially formed lightweight hybrid cartridge case. External dimensions of the lightweight hybrid cartridge case 100 conform with those of conventional brass cartridges, so that ammunition made using these lightweight hybrid cartridge cases 100 are fit for use in conventional weapons.

As shown in FIGS. 1A and 1B, the lightweight hybrid cartridge case 100 is made up of an aluminium base cap 110, a polymer shell 150 and an overmolded sleeve 180 overmolded at the aluminium-polymer joint with the same material as the polymer shell 150. In one embodiment, both the polymer shell 150 and the overmolded sleeve 180 is made from reinforced polyamide 6 having a yield strength of substantially 160 MPa or more according to ASTM D638 and having an impact strength of substantially 180 J/m or more according to ASTM D256. Preferably, the reinforcement is a mixture of glass and carbon fibres; the mixture of carbon fibres and glass fibres constitutes a range of substantially 40% to 60% by weight of the composition. Table A summarises the components of the reinforced polyamide 6 composition. This mixed-fibres reinforced polyamide composition also has very low moisture absorption and a low creep rate.

TABLE A

Reinforced polyamide composition

| Component: | CAS No. | Weight %: |
|---|---|---|
| Polyamide 6 | 25038-54-4 | 35-45 |
| Glass fiber | 65997-17-3 | 35-45 |
| Carbon fiber | 7440-44-0 | 5-15 |
| additives | | <10 |
| Total: | | 100 |

Figure 1C:
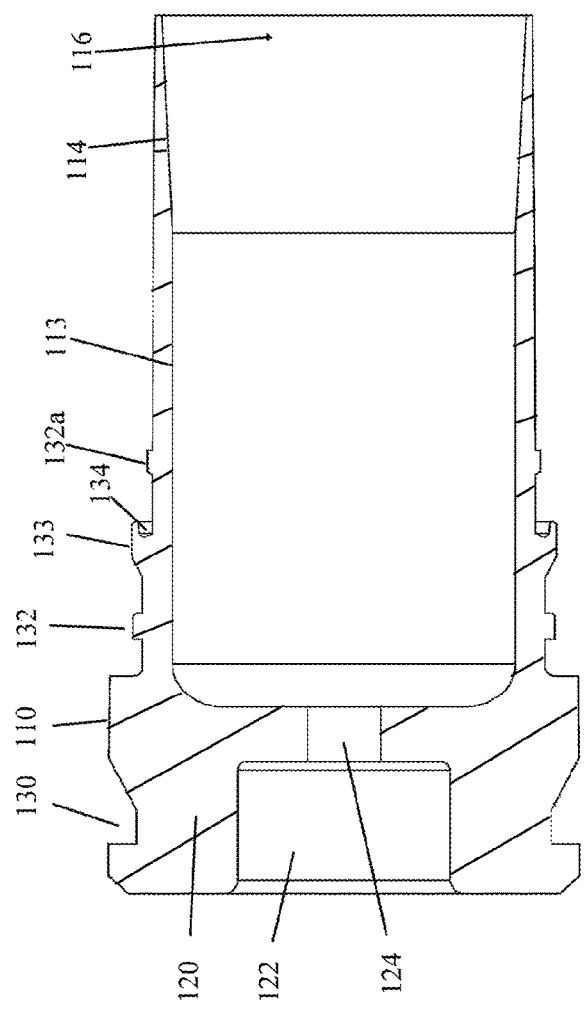
FIG. 1C is an enlarged view of the metal base cap of the cartridge case, whilst

The aluminium base cap 110 is substantially in the shape of a hollow cup. FIG. 1C shows the base cap 110 at an enlarged scale; as seen in FIGS. 1A-1C, the base cap 110 has a base 120 and a sidewall 112 that extends to a mouth 116. An interior surface of the sidewall 112 extends from the base 120 with a cylindrical portion 113 and opens to the mouth 116 with a taper 114; the length of the taper 114 is substantially half the length of the cylindrical portion 113. After molding, as seen in FIG. 1A, the composite sidewall has an exterior cylindrical surface, with a thickness at the base 120 being relatively thicker than a thickness of the composite sidewall. On a rear end of the base 120, a primer cavity 122 is formed to receive a primer cap 10. The primer cavity 122 is in communication with an interior of the base cap 110 through a flash hole 124. At the cylindrical periphery of the base 120, an annular groove is formed to define an extraction rim 130. Forward of the extraction rim 130, along substantially a third of a length of the sidewall 112 from the base 120, the periphery of the sidewall 112 is formed with two stepped ridges 132, 132a and a C-stepped ridge 133 located between the two stepped ridges 132, 132a. As seen in FIGS. 1A-1C, the C-stepped ridge 133 is formed with a C-shaped edge 134 where the C-shape is forward facing. The significance of the C-shaped edge 134 will be appreciated when test results are described at a later section. Preferably, the forward stepped ridge 132a is formed at a diameter smaller than the diameter at the rear stepped ridge 132 or C-stepped ridge 133. In one embodiment, the base cap 110 is made from high strength aluminium grade 7075T6, and is selected specifically for the flash hole 124 to withstand burning gases from a propellant 20 disposed inside the cartridge case 100 during firing. In a variation, the rear stepped ridge 132 is also formed with a C-shaped edge 134; in another variation, these two rear C-stepped ridges thus formed are spirally connected.

Again as seen from FIGS. 1A and 1B, the polymer shell 150 is made up of a substantially cylindrical body 151 and a forward bottleneck 152. A mouth 153 of the bottleneck 152 is open and is dimensioned to fit with a projectile 30. As seen from FIG. 1B, the thickness of the polymer shell at the bottleneck (ie. Tt) is thicker than the thickness (ie. Tc) at the cylindrical body 151. A length of the throat transitioning into the mouth (ie. Lt as seen in FIG. 1B) is thus maximized. It is thought that Tt>Tc and a large Lt help to maintain dimensional stability and strength of the polymer shell 150 around the mouth 153. At the opposite end (ie. the rear end), the polymer shell 150 is formed with a stepped diametral end 154.

According to the present invention, the base cap 110 is inserted and connected to the polymer shell 150 so that the stepped diametral end 154 is contiguous with the forward stepped ridge 132a. The overmolded sleeve 180 is then overmolded over the stepped ridges 132, 132a, the C-stepped ridge 133 and the stepped diametral end 154 of the polymer shell 150 with the same material as the polymer shell 150, so that an outside diameter of the overmolded sleeve 180 matches both the outside diameters of the base 120 and the polymer shell 150. It is observed that overmolding of the sleeve 180 at the stepped diametral end 154 with the same polymer gives exceptionally strong bonding at the interface between the overmolded sleeve 180 and the stepped diametral end 154; in contrast, conventionally, overmolding is carried out with different polymers.

Even with this exceptionally strong bonding between the overmolded sleeve 180 and the stepped diametral end 154, the C-stepped ridge 133 is provided to stop any pressure bleed in the firing chamber 5 during firing, ie, through the interface between the base cap 110 and the overmolded sleeve 180. After the polymer shell 150 and overmolded sleeve 180 are formed, the interior cavity of the cartridge case 100 is then filled with a propellant 20 during a method of manufacture 200 to produce a cartridged ammunition.

The fit at the mouth 153 of the polymer shell 150 with the projectile 30 determines a pull strength on the projectile. To enhance the pull strength on the projectile 30, a varnish 160 is applied on the inside surface of the mouth 153. For eg., with the present invention, the chamber pressure has been successfully tested to 4200 bars. An advantage of using this varnish 160 is that no visible debris is released when the projectile 30 is ejected from the hybrid cartridge case 100; if a circular rib were used to grip onto the projectile 30, as in some conventional designs, breaking of the circular rib during firing generates air borne debris. On the other hand, when the mouth 153 was joined to the projectile 30 using an adhesive, the adhesive bonding was too strong and breaking of the polymer shell 150 at the mouth 153 also caused air borne debris. The projectile's pull strength together with the inside cavity of the hybrid cartridge case 100 and capping force at the primer cavity 122 then determine a capacity of gas pressure that can build up inside the cartridge case 100 for the propellant 20 to burn completely and at a predetermined rate in order to propel the projectile 30 along a barrel of a weapon at or above a predetermined speed. Thus, a reader will appreciate that a ballistic performance of a cartridged ammunition also depends on the strength of the hybrid cartridge case 100, namely, the base cap 110, the polymer shell 150, the overmolded sleeve 180 and the bonding along these interfaces.

Figure 1D:
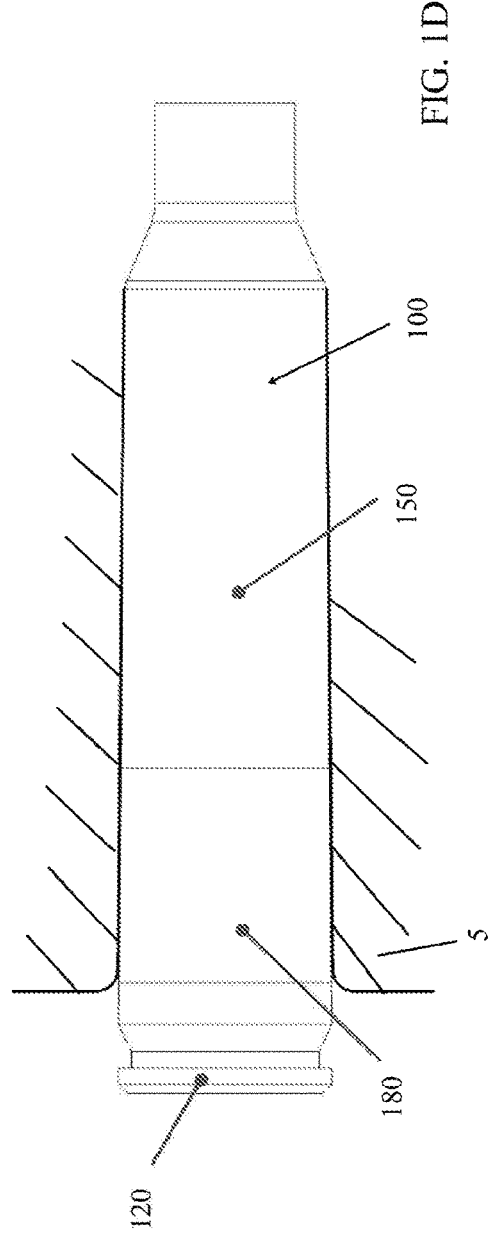
FIG. 1D illustrates non-metal-metal contact between a firing chamber with the hybrid cartridge.

After rapid firing of the hybrid cartridge cases 100, the firing chamber of the weapon becomes very hot, sometimes up to substantially 150 degree C. cook-off temperature. FIG. 1D shows the hybrid cartridge case 100 is located in a firing chamber 5; an advantage of the present invention is that the polymer shell 150 and the overmolded sleeve 180 are in contact with walls of the firing chamber 5, and thus there is no direct metal-metal contact; as a result, heat from ignition of the propellant 20 does not transfer fully to walls of the firing chamber 5; therefore, the propellant 20 inside the hybrid cartridge case 100 is not subjected to very high cook-off temperatures; evidently, the hybrid cartridge cases 100 of the present invention had been tested and found to withstand this cook-off temperature.

Figure 2:
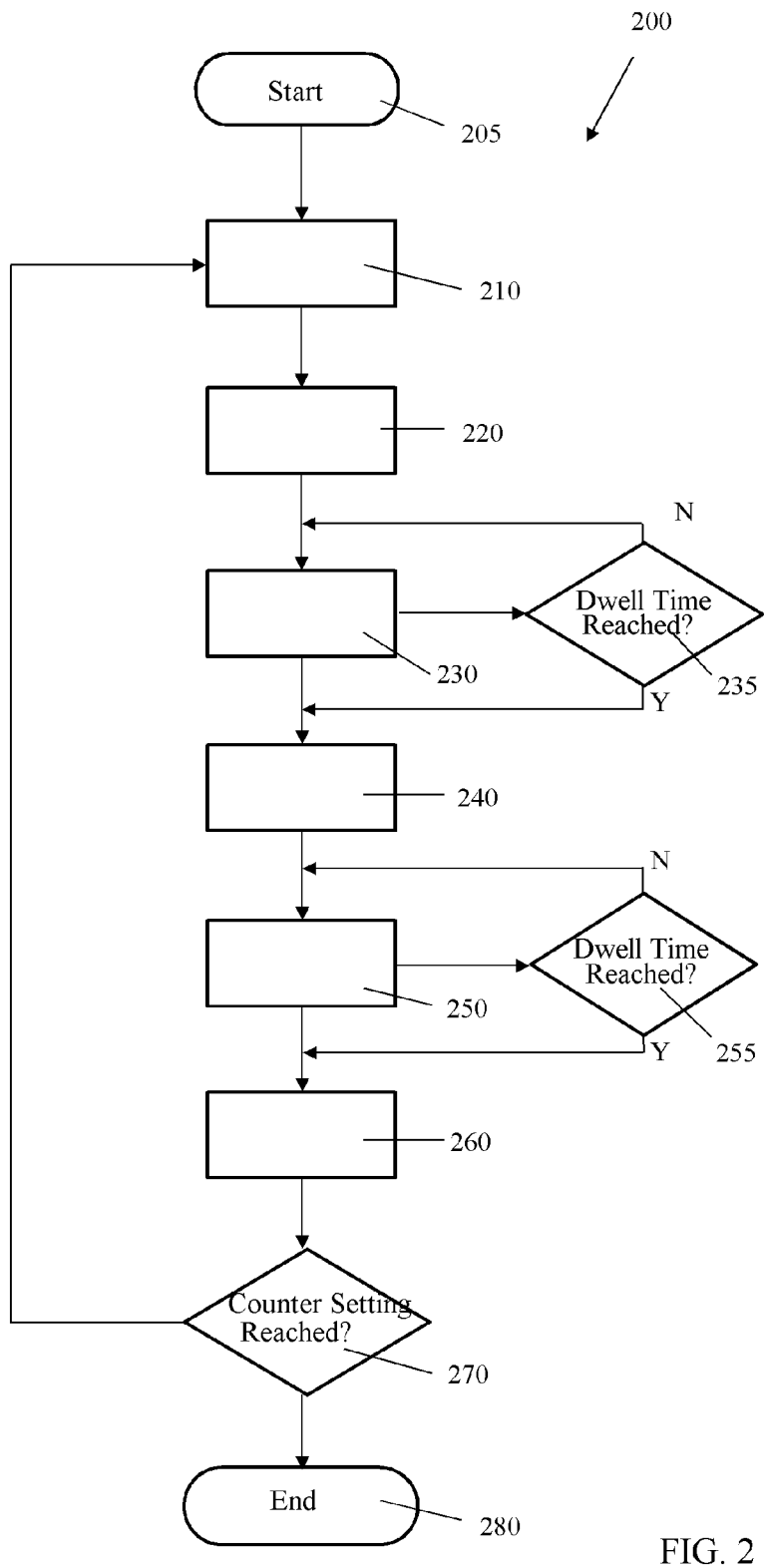
FIG. 2 illustrates a 2K process for the manufacture of the lightweight hybrid cartridge case shown in FIG. 1A.

In the following paragraphs, a 2K process for the manufacture 200 of the above hybrid cartridge case 100 is described with reference to a flow chart shown in FIG. 2:

In step 205, preparation for the 2K molding starts with oven drying of the polymer pellets at substantially 80-90 degree C. for substantially 4-6 hours, preheating the mold to substantially 65-85 degree C. and setting the injection molding parameters as follow: temperature to substantially 240-280 degree C.; injection pressure to medium high; screw speed to moderate; and entering a production counter based on a batch size.

In step 210, the aluminium base caps 110 are loaded into a magazine. In step 220, the injection molding process is started and the polymer shell 150 is molded. In step 230, the injection pressure is held for a set dwell time; a decision is made in step 235, whether the dwell time has elapsed. If the decision in step 235 is negative, the injection process reverts to step 230 until a decision in step 235 is positive and the injection process then proceeds to step 240.

In step 240, the mold is opened, and the molded polymer shell 150 is rotated through 180 degree, and each base cap 110 is then inserted into a molded polymer shell 150; each overmold sleeve 180 is overmolded over the stepped ridges 132, 132a, 133 on the base cap 110 and stepped diametral end 154 of the polymer shell 150. The process 200 proceeds to steps 250 and 255 until the injection pressure is maintained over the predetermined dwell time, before each completely molded hybrid cartridge case 100 is ejected in step 260. A decision in step 270 is then made whether the production counter has reached its setting; if the decision in step 270 is negative, the injection process 200 continues; if the decision in step 270 is positive, the injection process stops in step 280. After molding, the hybrid cartridge cases 100 are filled with the propellant 20, applied with the varnish 160, and the projectile 30 is pressed-fitted; however, these finishing processes are not described here.

While specific embodiments have been described and illustrated, it is understood that many changes, modifications, variations and combinations thereof could be made to the present invention without departing from the scope of the present invention. For eg., the polyamide includes other types or grades of polyamide. In another eg., each base cap 110 can be inserted molded with a polymer shell 150 during the above manufacturing process.

The invention claimed is:

1. A lightweight hybrid cartridge case comprising:
a base cap made of aluminium and having a cylindrical sidewall connected to a base, wherein the base is dimensioned according to a cartridged ammunition and wherein a periphery surface of the base is formed with an annular grooved extraction rim and a plurality of stepped ridges located forward of the extraction rim;
a polymer sleeve made from a mixture of glass and carbon fibres reinforced polyamide, with the polymer sleeve having a forward bottleneck opening and a rear stepped diametral end, wherein the stepped diametral end is insert molded onto the cylindrical sidewall of the base cap at a location contiguous with a first of the plurality of the stepped ridges; and
an overmolded sleeve made of the same material as the polymer sleeve is overmolded over the plurality of stepped ridges and the stepped diametral end, so that an outside diameter of the overmolded sleeve matches the outside diameters of both the extraction rim and the polymer sleeve.

2. The lightweight hybrid cartridge case according to claim 1, wherein the plurality of stepped ridges comprises three stepped ridges.

3. The lightweight hybrid cartridge case according to claim 2, wherein the second stepped ridge has a C-shaped edge in which the C-shape is forward facing.

4. The lightweight hybrid cartridge case according to claim 2, wherein the third stepped ridge has a C-shaped edge in which the C-shape is forward facing.

5. The lightweight hybrid cartridge case according to claim 4, wherein the second and the third stepped ridges are spirally connected.

6. The lightweight hybrid cartridge case according to claim 1, wherein a diameter of the first of the plurality of stepped ridges is smaller than the diameter of the remaining stepped ridges.

7. The lightweight hybrid cartridge case according to claim 1, wherein the reinforced polyamide comprises substantially 40-60% mixture of carbon and glass fibres by weight of the polymer composition.

8. The lightweight hybrid cartridge case according to claim 1, wherein the reinforced polyamide has properties exceeding a yield strength of substantially 160 MPa, exceeding an impact strength of substantially 180 J/m and has low moisture absorption.

9. The lightweight hybrid cartridge case according to claim 1, further comprises a varnish disposed on the inside surface of a mouth of the bottleneck opening.

10. An ammunition article obtained using the lightweight hybrid cartridge case according to claim 1.

11. A method of manufacture of a hybrid cartridge case, the method comprising:

forming a base cap from an aluminium, with the base cap having a cylindrical sidewall connected to a base, with the base being dimensioned according to a cartridge ammunition;

forming an annular groove extraction rim at a periphery surface of the base and a plurality of stepped ridges forward of the extraction rim;

forming a primer cavity at a rear end of the base cap;

forming a flash hole to connect the primer cavity with an interior cavity of the base cap;

injection molding a polymer sleeve made from a mixture of glass and carbon fibres reinforced polyamide, with the polymer sleeve having a forward bottleneck opening and a rear stepped diametral end;

inserting each base cap into a molded polymer sleeve so that the base cap is contiguous with a first of the plurality of stepped ridges; and overmolding a sleeve with the same material as the polymer sleeve over the plurality of stepped ridges and stepped diametral end of the polymer sleeve, so that an outside diameter of the overmolded sleeve matches the outside diameters of both the extraction rim and the polymer sleeve to form a hybrid cartridge case.

12. The method according to claim 11, further comprising:

filling an interior cavity of the hybrid cartridge case with a predetermined amount of propellant;

press-fitting a projectile into the bottleneck opening; and fitting a primer cap into the primer cavity.

13. The method according to claim 12, further comprising:

applying a varnish on an inside surface of a mouth at the forward bottleneck opening prior to press-fitting.

14. An ammunition article made using the method of manufacture of the lightweight hybrid case according to claim 11.

* * * * *